US006541963B2

(12) United States Patent
Mednikov et al.

(10) Patent No.: US 6,541,963 B2
(45) Date of Patent: Apr. 1, 2003

(54) DIFFERENTIAL EDDY-CURRENT TRANSDUCER

(76) Inventors: Felix Matveevich Mednikov, ul.Klinicheskaya, d-14, kv.130, 443082 Samara (RU); Stanislav Felixovich Mednikov, ul.Krasnoarmeiskaya, d-121, kv.35, 443096 Samara (RU); Mark Lazarevich Nechaevsky, ul.Novosadovaya, d.30, kv.362, 443110 Samara (RU)

( * ) Notice: Subject to any disclaimer, the term of this patent is extended or adjusted under 35 U.S.C. 154(b) by 0 days.

(21) Appl. No.: 10/034,447

(22) Filed: Dec. 27, 2001

(65) Prior Publication Data
US 2002/0121895 A1 Sep. 5, 2002

(30) Foreign Application Priority Data

Dec. 28, 2000 (RU) ........................ 2000132816

(51) Int. Cl.$^7$ ..................... G01N 27/72; G01R 33/12
(52) U.S. Cl. ........................ 324/225; 324/234
(58) Field of Search .................... 324/225, 233, 324/234, 236–238, 656–657

(56) References Cited

U.S. PATENT DOCUMENTS

| | | | | |
|---|---|---|---|---|
| 3,684,961 A | * | 8/1972 | Muir et al. | 324/207.18 |
| 3,721,859 A | * | 3/1973 | Blanyer | 361/236 |
| 4,446,427 A | * | 5/1984 | Lovrenich | 324/207.16 |
| 5,541,510 A | | 7/1996 | Denielson | 324/233 |

FOREIGN PATENT DOCUMENTS

DE        38 17 371         11/1989

OTHER PUBLICATIONS

Kaman Instrumentation (USA) "The Measuring Solution Handbook", 1999, pp. 4–6.

* cited by examiner

Primary Examiner—Jay Patidar
(74) Attorney, Agent, or Firm—Collard & Roe, P.C.

(57) ABSTRACT

The invention relates to measurement technology and can find application for nondestructive testing electrically conducting and/or ferromagnetic materials and products. The differential eddy-current transducer comprises a primary detector (1) which incorporates two similar search coils (2, 3) and an additional coil (4) having its leads connected in series aiding to respective first leads of the search coils (2, 3) to second leads of which voltage is applied in antiphase. The transducer further comprises an electronic unit (5) which is electrically connected to the primary detector (1) and incorporates a potentiometer (6), a capacitive element (7), and an operational amplifier (8). Two leads of the potentiometer (6) are connected to common connection points of the leads of the search coils (2, 3), and its midpoint lead is connected to the capacitive element (7) which in turn is connected to the inverting input of the operational amplifier (8) whose noninverting input is grounded. The output of the operational amplifier (8) serves as the output of the electronic unit (5). The eddy-current transducer is capable of enhancing the measurement accuracy due to compensating for temperature errors, increasing the resolution and noise immunity thereof.

11 Claims, 2 Drawing Sheets

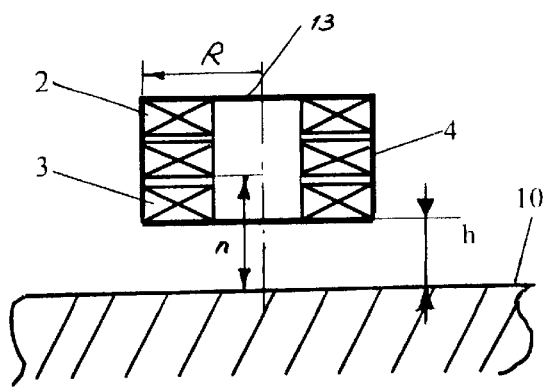
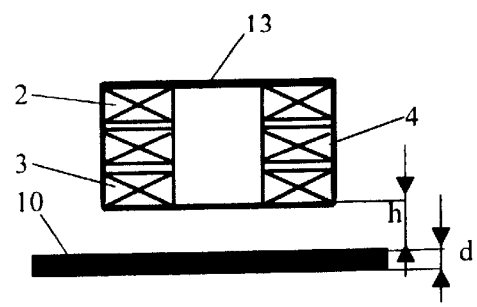
Fig.2　　　　　Fig.3
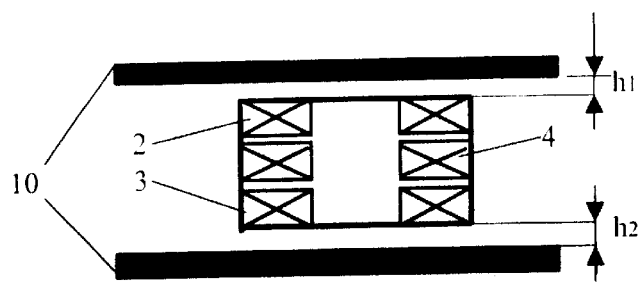
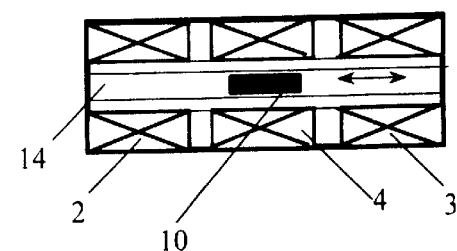
Fig.4　　　　　Fig.5
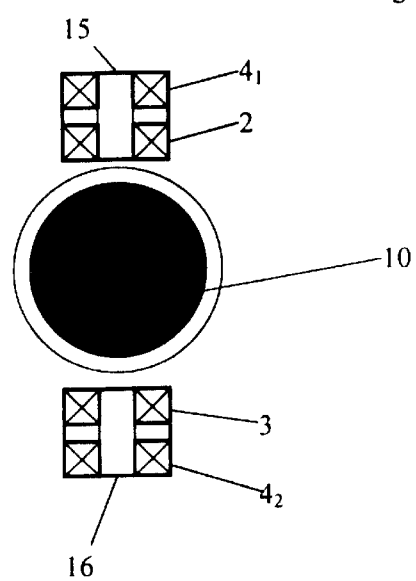
Fig.6

DIFFERENTIAL EDDY-CURRENT TRANSDUCER

The present invention relates in general to measuring technology and has particular reference to a differential eddy-current transducer.

FIELD OF THE INVENTION

The present invention can find application in mechanical engineering for non-destructive testing of current-conducting and/or ferromagnetic materials and products, namely, for measuring a distance to the surface, thickness of sheeting and coatings, dimensions of articles, as well as for control over production processes, in flaw detection, and in other fields of engineering and technology.

BACKGROUND OF THE INVENTION

At present there are numerous constructions of differential eddy-current transducers extensively used in diverse apparatus and instruments, and in measuring systems.

Most of the heretofore-known eddy-current transducers are characterized by the presence of an error in the results of measurements, the so-called additional error, caused by external factors. Many of the improvements in the construction of the known eddy-current transducers are aimed at increasing the accuracy of measurements by minimizing the additional error; nevertheless, at present this problem is far from being solved completely.

Known in the art presently is a differential eddy-current transducer for measuring mechanical (non-electrical) quantities (cf. DE #3,817,371 A1) which comprises two coils and a ferromagnetic core movable inside said coils and connected to the object under control. Depending on the position assumed by the core the inductance values of the coils are varied, a common lead-out of said coils being connected to one of the inputs of an LC-oscillator while two other lead-outs thereof are alternately connected, via an analog multiplexer, to a second input of said LC-oscillator. The oscillation frequency of the self-excited oscillator depends on the inductance value of the LC-circuit, i.e., on the fact which of the coils at a given instant of time is connected to the input thereof. The frequency of the output signal of the LC-oscillator is determined after connecting each of the two coils, whereupon a microcomputer calculates, against the difference between frequencies, the value of the quantity measured by the transducer.

The eddy-current transducer discussed before is characterized by a low operating speed, necessity to make use of multi-digit counters (since its deviation is relatively low), restricted resolution, as well as reasonably high complexity and, accordingly, high cost of hardware implementation.

Known in prior art is an eddy-current measuring system (cf. U.S. Pat. No. 5,541,510 A) for non-destructive testing of electrically conducting and/or ferromagnetic materials and products, comprising a generator supplying power to an impedance network, an amplitude detector, a phase detector, demodulators, a computing unit, and an eddy-current transducer having one search coil and establishing a resonant circuit together with a parallel-connected capacitor. Said measuring system enables measuring two parameters pertaining to the object under test. However, it is more than two parameters that actually affect the eddy-current transducer in this case.

For instance, when measuring a distance to the object being tested and a linear dimension (thickness) thereof, a possible change in at least two out of the three other parameters occur to be non-compensated, viz, conductance, magnetic permeability, and temperature, as well as, probably the rest of the parameters of the object involved (its linear dimensions inclusive).

Effect of said factors on the results of measurements is partly eliminated in an embodiment of the system comprising two differentially connected eddy-current transducers. However, such a variant of the system involves stricter requirements imposed on the eddy-current transducers used, that is, as to similar dimensions and electric parameters, which is hard-to-attain due to technological spread in characteristics.

Furthermore, it is necessary that both of the eddy-current transducers be positioned very precisely so that they are in a similar position with respect to the object under test and/or under similar environmental conditions.

Non-identity of the eddy-current transducers and their arrangement results in an incomplete compensation for change in uncontrollable factors and, accordingly, leads to errors in the results of measurements.

In addition, processing of signals generated by eddy-current transducers necessitates the use of a costly instrument amplifier. The aforesaid peculiar features of the system add to its complexity and cost.

For electrically connecting eddy-current and inductive transducers there are most extensively used bridge circuits, wherein one of the bridge diagonals is power-supplied from a source of sinusoidal voltage, and the other bridge diagonal is connected to the inputs of a differential amplifier after which an alternating voltage is subjected to phase-sensitive detection and filtration.

Such circuit designs are characterized by sophisticated balancing, certain non-linearity of an unbalanced bridge, temporal and temperature instability, influence of electromagnetic interference protection against which involves the use of, e.g., expensive coaxial cable.

The closest to the herein-proposed transducer is a differential eddy-current transducer described in a prospectus of the Kaman Instrumentation (USA) entitled "The Measuring Solution Handbook", 1999, p.6 (also pp. 4 and 5), which transducer is also based on a bridge circuit.

Said known eddy-current transducer comprises a primary detector incorporating two similar search coils and an electronic unit comprising two capacitive and two resistive elements. Each of the search coils is shunted by a capacitive element together with which said coil forms a parallel resonant circuit. Both of such circuits are cut into adjacent arms of the bridge whose other two arms are in effect the resistive elements. The common point of the windings is grounded and an alternating voltage is applied to the common point of the resistive elements. An output signal generated by the circuit is picked off the common points of the resistors and coils.

To compensate for temperature instability is possible only in case of a balanced bridge, i.e., only with a fixed position of the object under test and an invariable value of the electromagnetic parameters of the object (that is, electrical conductance and magnetic permeability).

An incomplete identity of the parameters of the search coils and the presence of a spread in the parameters of the transducer circuitry components hampers selecting the capacitive elements for the resonant circuits and resistive elements for balancing the bridge arms. Hence complete balancing is practically impossible due to the fact that the bridge arms are formed by dissimilar elements. Even when the bridge is amplitude-balanced, a phase shift occurs which results, in case of phase-sensitive demodulation, in a "zero-drift" error, affected resolution and temperature instability of the output signal.

An upset bridge balance occurs in the course of measurements when the object under test produces an unsymmetrical effect upon the search coils, which also tells negatively on the accuracy of the results of measurement.

And finally, further conversion of a pickup signal requires a differential (instrument) amplifier which complicates measuring equipment as a whole and adds to the cost thereof.

BRIEF DESCRIPTION OF THE INVENTION

It is an essential object of the invention to enhance the accuracy of measurements by compensating for the additional error caused by external factors.

It is another object of the invention to enhance the resolving power and interference immunity of a differential eddy-current transducer.

The foregoing object is accomplished due to the fact that in a differential eddy-current transducer comprising a primary detector which is adapted to co-operate with the object under test and incorporates two similar search coils, each of which has a first output and a second output, a voltage being applied to said second output, and an electronic unit electrically connected to said primary detector, said electronic unit comprises a resistive element, a capacitive element and a signal amplifier at the output of which an output signal is shaped, according to the invention, said primary detector further comprises an additional coil having a first lead and a second lead through which leads said coil is connected in series aiding to the first outputs of the first and second search coils, respectively, the resistive element of said electronic unit appears as a potentiometer, and the signal amplifier appears as an operational amplifier having its non-inverting input grounded and its inverting input connected, via the capacitive element, to a midpoint lead of the potentiometer whose first and second leads are connected, respectively, to the first and second leads of the additional coil and to the first leads of the search coils, to the second leads of which an alternating voltage is applied in antiphase.

It is due to the herein-proposed technical solution that the present differential eddy-current transducer allows enhancing the accuracy of measurements due to compensating for temperature instability both under conditions of a symmetrical (similar) effect produced by the object under test on the search coils and in case of a non-symmetrical effect produced on the search coils and, moreover, when the object under test influences one coil only.

The additional coil is exposed to the same physical conditions as the search coils, whereby its impedance varies approximately to the same extent as from external factors. On account of a ratio-metering connection circuit of the coils, an output signal of the differential eddy-current transducer is directly proportional either to the ratio between the impedances of the search coil or the impedance coupled by the object under test, and the impedance of the additional coil, whereby an adverse effect of an ambient temperature on the accuracy of measurement is compensated for considerably.

It is important that the impedance values of the first and second search coils be equal to each other, and the impedance value of the additional coil be much in excess of that of each of the search coils, while the Q-factor of the first and second search coils and of the additional coil be equal to one another in the absence of the object under test.

It is reasonable, from the viewpoint of construction arrangement, that the differential eddy-current transducer comprises a first coil former on which the first search coil, the additional coil, and the second search coil are arranged in series and coaxially.

Depending on the characteristics of the controlled parameters of the object under test (i.e., air gap, thickness, diameter, length, conductance, magnetic permeability), at least one of said search coils is adapted for the object under test to be positioned nearby it.

In other embodiments of the invention the object under test may be disposed in an axial bore provided in the first coil former.

Whenever measurement is to be taken of a displacement performed by the object under test with respect to a certain fixed point, or of the length thereof, the axial length of the additional coil exceeds the length of the object under test with allowance for possible linear displacements thereof inside the axial bore of the first coil former.

Whenever the cross-sectional dimension of the object under test is to be measured or its electromagnetic properties are to be found, a total axial length of all of said coils should be less than the length of the object under test.

The present invention allows of measuring the parameters of diversely shaped objects.

In particular, for checking the wall thickness and/or the concentricity of the profile of a cylindrical shell, the additional coil is made up of two sections connected in series aiding to each other. The differential eddy-current transducer further comprises a second coil former whereon the first search coil and the first section of the additional coil are arranged, and a third coil whereon the second search coil and the second section of the additional coil are disposed, said first and said second search coils being adapted for the object under test to be interposed therebetween.

Such coils may have various predetermined configurations so as to suit the shape of the object under test.

Whenever the object under test is disposed outside the primary detector, a maximum cross-sectional dimension of the additional coil should be such that half the aforementioned dimension be less than the least possible axial distance from the additional coil to the object under test.

Such a cross-sectional dimension is selected on account of the fact that the object under test produces a substantial effect on the coil up to the aforesaid distance being approximately equal to half the coil cross-sectional dimension.

It is advantageous that the axial length of the additional coil should exceed the length of the object under test with allowance for its possible linear displacements within the axial bore of the first coil former, and that a total axial length of all of said coils be less than the length of the object under test.

It is expedient that the electronic unit should comprise a second capacitive element electrically connected to the potentiometer midpoint lead and to the output of the operational amplifier.

Provision of said second capacitive element adds to the reactive component of the impedance of the resonant circuit and thereby increases the Q-factor thereof.

It is favorable that the first and second search coils, the first and second capacitive elements, the potentiometer and the operational amplifier should have those parameters with which the first and second search coils and connected thereto the potentiometer, the first and second capacitive elements, and the operational amplifier form a series-connected resonant circuit having a Q-factor of from 10 to 20 with no object under test.

With no object under test the measuring circuit is tuned to resonance with the driving frequency and the impedance of the measuring circuit is changed under the effect of the object under test and hence the natural frequency of the circuit is changed, too, while high Q-factor value of the resonant circuit adds to the response of the present eddy-current transducer.

Further objects of the present invention will become apparent hereinafter from a detailed description of some specific embodiments thereof to be read with reference to the accompanying drawings.

BRIEF DESCRIPTION OF THE DRAWINGS

FIG. 2 is a first variant of disposing the object under test with respect to the primary detector of the differential eddy-current transducer;

FIG. 3 is a second variant of FIG. 2;

FIG. 4 is a third variant of FIG. 2;

FIG. 5 is a fourth variant of FIG. 2; and

FIG. 6 is a fifth variant of FIG. 2.

DETAILED DESCRIPTION OF THE INVENTION

Figure 1:
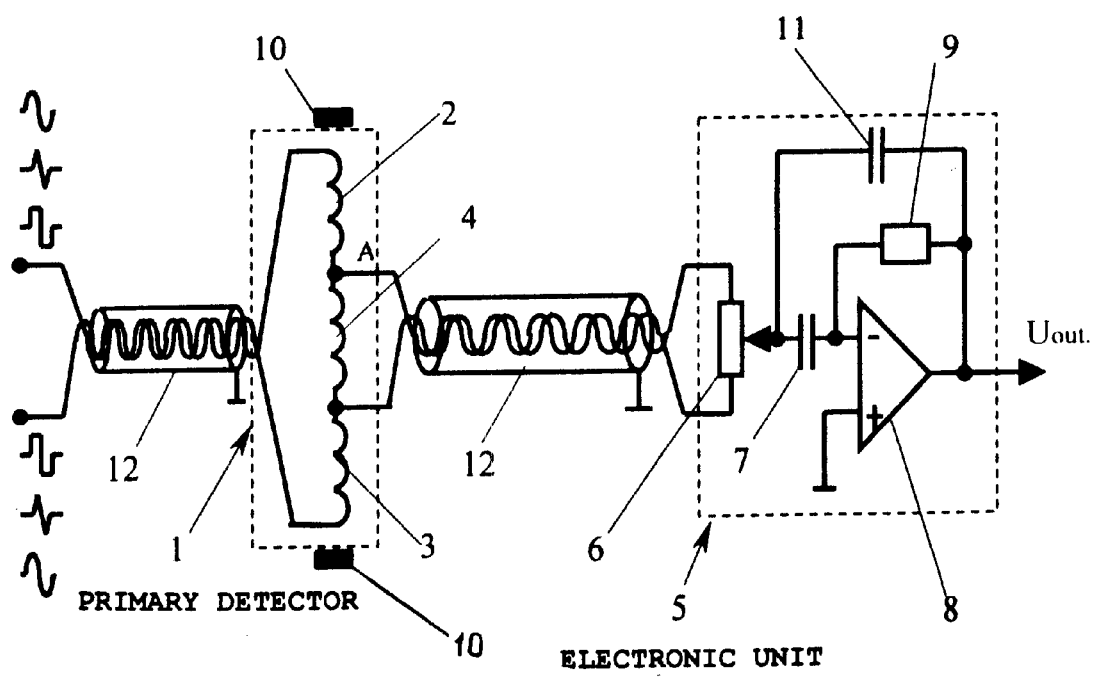
FIG. 1 is a block-diagram of a differential eddy-current transducer, according to the invention.

The herein-proposed differential eddy-current transducer comprises a primary detector 1 (FIG. 1) which incorporates two similar search coils 2 and 3, each having a first lead and a second lead, and an additional coil 4 provided with a first lead and a second lead. The coil 4 is connected in series aiding to the first leads of the first and second search coils 2, 3 to form common connection points A and B.

The present differential eddy-current transducer further comprises an electronic unit 5 which is electrically connected to said primary detector 1 and have a potentiometer 6, a capacitive element 7, and an operational amplifier 8 with a feedback resistor 9. The first and second leads of the potentiometer 6 are connected to the common connection points A and B of the leads of the search coils 2, 3 and of the additional coil 4, and the midpoint lead of the potentiometer 6 is connected to the capacitive element 7 which in turn is connected to the inverting input of the operational amplifier 8 having its noninverting input grounded. It is the output of the operational amplifier 8 that serves as the output of the electronic unit 5.

An object under test 10 disposed nearby the search coils 2, 3 is conventionally depicted in the accompanying drawing.

The differential eddy-current transducer under consideration further comprises a second capacitive element 11 connected to the potentiometer midpoint lead 6 and to the output of the operational amplifier 8. Provision of the second capacitive element 11 adds to the reactive component of the impedance of the resonant circuit and thereby increases the Q-factor thereof.

Power to the differential eddy-current transducer is supplied from a source of alternating voltage applied in antiphase.

The circuit of the herein-proposed differential eddy-current transducer is such that the additional coil 4 serves as a load impedance for the search coils 2 and 3, and the impedance of all the three coils 2, 3, and 4 is of inductive-resistive nature and therefore are featured by similar temperature dependence which is of paramount importance for providing temperature stability of the circuit. The series-connected coils 2, 3, and 4 form an inductive voltage divider supplied from the source of voltage. Such a connection is advantageous due to a possibility of using various voltage types, that is, harmonic, rectangular, or sawtooth which are conventionally depicted in FIG. 1.

Supplying the coils 2, 3, and 4 with an antiphase voltage makes it possible to dispense with a coaxial cable using twisted pairs of conductors protected with a shield 12 instead. In order to minimize inductance of wire conductors they are twined which decreases measuring errors due to the fact that the conductors are connected in series with the search coils 2, 3 and hence produce an effect on the impedance thereof. In addition, twining the conductors reduces their capacitance and hence stray current pick-up, as well as decreases substantially the noise level accounted for by, e.g., cable bends and external electromagnetic field. Under conditions of series resonance a single resistive element (i.e., the potentiometer 6) is quite sufficient for effectively balancing the circuit (in particular, compensating for dissimilarity of the parameters of the search coils 2, 3), since in case of a resonance an equivalent resistance of an oscillating circuit "coil-potentiometer-capacitor" is purely active.

The coils 2, 3, and 4 are made such that impedance of the additional coil 4 is much in excess of that of each of the search coils 2 and 3. In actual practice impedance of the additional coil 4 is seven to nine times that of each of the search coils 2 and 3. This is necessary in order to rule out any adverse effect of the object 10 under test on the current magnitude in the search coils 2, 3 insofar as the additional coil 4 is a current-setting one for the search coils 2 and 3. With the absence of the object 10 under test the Q-factors of all the three coils 2, 3, and 4 are similar.

The additional coil 4 is exposed to the same physical conditions as the search coils 2, 3, whereby its impedance varies approximately to the same extent as from external factors. On account of the fact that the coils 2, 3, and 4 are connected according to a ratio-metering circuit, an output signal of the differential eddy-current transducer is directly proportional either to the ratio between the impedances of the search coil 2, 3 and that of the additional coil 4, or to the ratio between the impedance reflected by the object 10 under test and the impedance of the additional coil 4, whereby the adverse effect of the ambient temperature on the accuracy of measurement is compensated for considerably.

Electric parameters of the search coils 2, 3, the potentiometer 6, the capacitors 7, 11, and the operational amplifier 8 are so selected that with the absence of the object 10 under test the search coils 2 and 3, the respective portion of the potentiometer 6 connected to said coils, the capacitors 7, 11, and the operational amplifier 8 establish a series resonant circuit having a Q-factor of from 10 to 20.

As to its construction arrangement, the differential eddy-current transducer comprises a coil former 13 (FIGS. 2–5) whereon the coils 2, 3, 4 of the primary detector 1 are arranged in series and coaxially in the following order: the first search coil 2, the additional coil 4, and the second search coil 3.

Depending on the characteristics of the controlled parameters of the object under test (i.e., air gap, thickness, diameter, length, electrical conductance, magnetic permeability), at least one of said search coils 2 and 3 is adapted for the object 10 under test to be positioned nearby it.

FIGS. 2 and 3 represent a variant of practical use of the herein-proposed differential eddy-current transducer for measuring a distance 'h' to the object 10 under test. The variant depicted in FIG. 3 also allows of measuring a thickness 'd' of the wall of a thin-walled object 10 under test.

Whenever the object 10 under test is disposed outside the primary detector 1, a maximum cross-sectional dimension 2R of the additional coil 4 should be such that half the aforementioned dimension be less than the least possible axial distance 'n' from the additional coil 4 to the object 10 under test.

Such a cross-sectional dimension is selected on account of the fact that the object under test produces a substantial effect on the coil up to the aforesaid distance being approximately equal to half the coil cross-sectional dimension.

FIG. 4 presents a variant of disposing the primary detector 1 inside the object 10 under test, the controlled parameters being distances $h_1$, $h_2$ between the respective search coils 2, 3 and the object 10 under test.

FIG. 5 displays an embodiment of the herein-proposed differential eddy-current transducer a coil former 13 of which has an axial bore 14, wherein the object 10 under test is axially displaceable. Such an embodiment of the differential eddy-current transducer is expedient whenever the length of displacement of the object 10 under test or the length of said object itself is to be measured, which is the case when testing a lot of products differing in length within certain limits.

Such being the case, an axial length of the additional coil 4 should exceed the length of the object 10 under test with due account of possible linear displacements thereof inside the axial bore 14, otherwise speaking, the object 10 under test should permanently be within the length of the additional coil 4.

In the event that a cross-sectional dimension is to be checked, e.g., the diameter of the object 10 under test or electromagnetic characteristics thereof (electrical conductance or magnetic permeability), so to exclude the effect of possible changes in the length of the object on the measuring results, a total axial length of all the coils 2, 4, 3 mentioned before should be less that the length of the object 10 under test.

In particular, the additional coil 4 intended for checking the wall thickness and/or concentricity of the profile of a cylindrical shell is made up two sections $4_1$, $4_2$ interconnected in series aiding, while the differential eddy-current transducer further comprises a second coil former 15 whereon coaxially arranged are the first search coil 2 and the first section $4_1$ of the additional coil 4, and a third coil former 16 whereon coaxially arranged are the second search coil 3 and the second section $4_2$ of the additional coil 4, the object 10 under test being interposed between the first and second search coils 2, 3.

The coils 2, 3, 4 may be made according to integration technology by evaporating an electrically conducting layer onto the surface of the coil former 13, 14, or 15 made of an insulant, followed by laser masking.

The herein-proposed differential eddy-current transducer functions as follows.

An electromagnetic field current-excited in the transducer coils 2, 3, 4 induces eddy currents in the object 10 under test, whose self-field in turn exerts influence upon the coils 2, 3, 4. Said co-operation of the coils 2, 3, 4 with the object 10 under test is conveniently characterizable in terms of a concept "coupled impedance", i.e., the impedance value by which the impedance of each of the search coils is changed under the effect of the object 10 under test.

In the absence of the object 10 under test both of the oscillating circuits of the transducer (built up by the search coil 2 or 3—capacitors 7, 11—potentiometer 6—operational amplifier 8) are tuned to resonance relative to the selected power supply frequency. In this case the output signal intensity approximates zero due to differential connection of the search coils 2, 3, 4. More precisely the zero value of the output voltage is set by the potentiometer 6 which enables to compensate for some difference in the initial (intrinsic) impedance values of the search coils 2, 3.

If object 10 when under testing is disposed on the side of only one search coil 2 or 3 (FIGS. 2, 3), e.g., the first one, so the second coil keeps serving to compensate for the intrinsic impedance (i.e., in the absence of the object under test)of the first coil. Hence an additive component of the additional error of measurement is compensated for, that is, a temperature change tells equally on the impedance values of the search coils 2, 3; it is due to the fact that said coils are connected differentially, the output signal remains unaffected; its magnitude is directly proportional to the ratio between the values of impedance coupled by the object in the first coil 2 and those of impedance of the additional coil 4, this being due to the fact that the coils 2, 3, 4 are connected according to a ratio-metering circuit. This in turn compensates for to a great extent the multiplicating component of the additional error (i.e., sensitivity error) accounted for by temperature effect on electromagnetic and geometrical characteristics of the object under test and hence on coupled impedance.

When the object 10 under test is disposed symmetrically with respect to the search coils 2, 3 the transducer output signal remains to be zero, since in this case not only their intrinsic impedances are compensated for mutually but also the coupled (similar) impedances. This is tantamount to compensating for an additive error, component, since all the constituent parts of the system "transducer-object" are under similar conditions.

And if the object under test is disposed asymmetrically with respect to the search coils 2, 3 (e.g., displaced towards either of said coils (FIGS. 4, 5), or has an asymmetrical shape (FIG. 6), or else has an inhomogeneous structure, so the coupled coil impedances are dissimilar and the output voltage is proportional to the ratio of the difference between said impedances to the impedance of the additional coil 4. Hence the multiplicating error of measurement is compensated for to a considerable extent, said error being due to temperature dependence of the coupled impedance (through the electromagnetic and geometrical characteristics of the object under test), and "zero setting error" is compensated for as before by subtracting the values of intrinsic impedance of the search coils 2, 3 by virtue of their differential connection.

When applying an alternating voltage having an amplitude U to the leads of the search coils 2, 3 in antiphase, current in the coils 2, 3, 4 is expressed by the formula $$I = \frac{2U}{Z_1 + Z_2 + Z_3} \quad (1)$$

where $Z_1$, $Z_2$, $Z_3$ are impedances of the respective search coils 2, 3 and of the additional coil 4. Impedance $Z_3$ of the additional coil 4 being much in excess of impedances of the search coils 2, 3, hence it may be assumed that $Z_1+Z_2+Z_3 \approx Z_3$ so that $$I = \frac{2U}{Z_3} \quad (2)$$

Voltage at the points A and B in the diagram of FIG. 1 is as follows $$U_A = U - IZ_1 = U\frac{Z_3 - 2Z_1}{Z_3} \quad (3)$$

$$U_B = -U + IZ_2 = U\frac{2Z_2 - 2Z_3}{Z_3} \quad (4)$$

Then the output voltage $U_{out}$ (i.e., the voltage at the output of the operational amplifier 8) is as follows:

$$U_{out} = k_A U_A + k_B U_B = U\left[k_A\left(1 - \frac{2Z_1}{Z_3}\right) + k_B\left(\frac{2Z_2}{Z_3} - 1\right)\right] \quad (5)$$

$$k_B = \frac{R_{oc}}{R_B} \quad k_A = \frac{R_{oc}}{R_A}, \quad (6)$$

where $k_A$, $k_B$ denote the transfer ratios at the inputs A and B, $R_{OC}$ is the feedback resistance 9 of the operational amplifier 8, $R_A$ and $R_B$ denote the resistance of the sections of the potentiometer 6 connected to the points A and B.

Impedance of each of the coils 2, 3, and 4 may be expressed through its quality factor Q as follows:

$$Z = R + j\omega L = R\left(1 + j\omega\frac{L}{R}\right) = R(1 + jQ) \quad (7)$$

The quality factors of all the three coils 2, 3, 4 with the absence of the object 10 under test are selected to be $Q_1 = Q_2 = Q_3$ whereby $$\frac{Z_1}{Z_2} = \frac{R_1(1+jQ_1)}{R_3(1+jQ_3)} = \frac{R_1}{R_2}, \frac{Z_2}{Z_3} = \frac{R_2(1+jQ_2)}{R_3(1+jQ_3)} = \frac{R_2}{R_3} \quad (8)$$

and the expression (5) assumes the following form:

$$U_{out} = U\left[k_A\left(1 - \frac{2R_1}{R_2}\right) + k_B\left(\frac{2R_2}{R_3} - 1\right)\right] \quad (9)$$

With $R_1 = R_2$ $U_{out} = 0$ when $k_A = k_B$, that is, $R_A = R_B$. However even if the search coils 2, 3 are not absolutely identical i.e., $R_1 \neq R_2$, zero voltage may be set at the output of the circuit by appropriately adjusted using the potentiometer 6 the resistances $R_A$ and $R_B$ of the potentiometer sections, and hence the transfer ratios $k_A$ and $k_B$. In this case the output signal will be equal to zero not only in amplitude but also in phase which adds to the resolution of the circuit.

When temperature conditions deviate from the nominal ones, resistance values of the search coils 2, 3 varies according to the expression $$R(t) = R_0[1 + \alpha(t - t_0)] \quad (10)$$

where t denotes the temperature of the wire conductor of the coil 2, 3, 4, $R_0$ is the coil resistance at nominal temperature $t_0$, $\alpha$ denotes temperature coefficient of resistance. Substituting (10) and (9) we obtain $$U_{out} = U\left[k_A\left(1 - \frac{2R_{10}}{R_{30}}\right) + k_B\left(\frac{2R_{20}}{R_{30}} - 1\right)\right] \quad (11)$$

whence it is obvious that when the object 10 under test is absent, the output signal of the circuit is independent of temperature variations.

Expression (11) retains its validity also when the object 10 under test exerts symmetrical (similar) influence on the search coils 2, 3. When the object 10 under test produces different effects on the search coils 2, 3 or acts only on either of them, the expression for $U_{out}$ assumes the form of (5) where the impedance of each of the search coils 2, 3 may be represented as the sum of the intrinsic impedance $Z_o$ and the coupled impedance $\Delta Z$:

$$Z_1 = Z_{10} + \Delta Z_1, Z_2 = Z_{20} + \Delta Z_2, \quad (12)$$

Hence assuming $Z_{10} = Z_{20}$ and, consequently, $k_A = k_B = k$, we obtain from (5):

$$U_{out} = 2Uk\frac{\Delta Z_2 - \Delta Z_1}{Z_3} \quad (13)$$

that is, the output voltage is independent of the initial (intrinsic) impedances of the search coils 2, 3. This is tantamount to compensating for an additive component of a temperature error and of any additional error whatever, since both of the search coils 2, 3 are under similar physical conditions any change of which tells equally on their impedances, the equality $Z_{10} = Z_{20}$ remaining unaffected.

Presence of the relations $\Delta Z_1/Z_3$ and $\Delta Z_2/Z_3$ is accounted for by the ratio-metering circuit of connection of the search coils 2, 3 and of the additional coil 4. This makes it possible to compensate for, to a considerable extent, also the multiplicating component of an additional (temperature-dependent) error, since all the coils 2, 3, 4 are exposed to similar physical conditions, while the impedances $\Delta Z$ and $Z_3$ are of the similar active-inductive behavior.

Provision of differentially connected high-Q resonant circuits in the circuitry of the herein-proposed transducer ensures high sensitivity to a change in the impedances of the search coils. Furthermore, said resonant circuits also add to noise immunity of the transducer circuit, since each series-connected resonant circuit serves as a band-pass filter suppressing low-frequency noise. Provision of an additional capacitor contributes to a higher quality factor of the resonant circuits.

What we claim is:

1. A differential eddy-current transducer adapted for use in means for nondestructive testing electrically conducting and/or ferromagnetic objects, comprising:
    a primary detector, including:
        a first search coil having a first lead and a second lead;
        a second search coil having a first lead and a second lead and constructed similarly to said first search coil;
        an additional coil having a first lead and a second lead, and connected in series aiding between said first search coil and said second search coil, said first lead of said additional coil being connected to said first lead of said first search coil, and said second lead of the additional coil is connected to said first lead of said second search coil;
    said differential eddy-current transducer further comprising:

an electronic unit, including:
- a potentiometer having a first lead, a second lead, and a midpoint lead;
- said first lead of said potentiometer connected to said first lead of said first search coil and to said lead of said additional coil;
- said second lead of said potentiometer connected to said first lead of said second search coil and to said second lead of said additional coil;
- a first capacitive element having a first lead and a second lead;
- said first lead of said first capacitive element connected to said midpoint lead of said potentiometer;
- an operational amplifier having an inverting input connected to said second lead of said first capacitive element, a noninverting input which is grounded, and an output serving as the output of said electronic unit;
- a feedback resistance cut in between said inverting input of said operational amplifier and said output thereof;
- said second lead of said first search coil and said second lead of said second search coil, both being adapted for connecting to a source of alternating voltage applied to said second leads in antiphase.

2. A differential eddy-current transducer according to claim 1, wherein said first and second search coils and said additional coil are characterized by the impedance value, and the values of said impedances of said first and second search coils are equal to each other and the value of said impedance of said additional coil exceeds much the value said impedance of said first or said second search coil.

3. A differential eddy-current transducer according to claim 1, wherein said first and second search coils and said additional coil are characterized by the value of Q-factor, and the values of said Q-factors of said first search coil and of said additional coil are equal to each other when said object under test is absent.

4. A differential eddy-current transducer according to claim 1, comprising:
- a first coil former whereon said first search coil, said additional coil, and said second search coil are arranged in series and coaxially.

5. A differential eddy-current transducer according to claim 4, wherein said first coil former has an axial bore adapted for the object under test to accommodate.

6. A differential eddy-current transducer according to claim 1, wherein said additional coil has a first section and a second section interconnected in series aiding, and said differential eddy-current transducer further comprises:
- a second coil former whereon said first search coil and said first section of said additional coil are arranged;
- a third coil former whereon said second search coil and said second section of said additional coil are arranged, said first and second search coils being adapted for said object under test to be disposed therebetween.

7. A differential eddy-current transducer according to claim 1, wherein said additional coil is characterized by the value of a maximum cross-sectional dimension which is so selected that half said dimension is less than the least possible axial distance from said additional coil to said object under test.

8. A differential eddy-current transducer according to claim 5, wherein the axial length of said additional coil exceeds the length of said object under test with due allowance for possible linear displacements thereof within said axial bore of said first coil former.

9. A differential eddy-current transducer according to claim 1, wherein a total axial length of all of said coils is less than the length of said object under test.

10. A differential eddy-current transducer according to claim 1, further comprising a second capacitive element having a first lead connected to said midpoint lead of said potentiometer, and a second lead connected to said output of said operational amplifier.

11. A differential eddy-current transducer according to claim 10, wherein said first and second search coils, said first and second capacitive elements, said potentiometer, and said operational amplifier are characterized by the values of electric parameters which are selected such that when said object under test is absent, said first and second search coils and connected thereto said potentiometer, said first and second capacitive elements, and said operational amplifier form a series-connected resonant circuit having a Q-factor of from 10 to 20.

* * * * *